Patented Aug. 8, 1933

1,921,591

UNITED STATES PATENT OFFICE 1,921,591

PROCESS FOR THE MANUFACTURE OF ZINC WHITE

Viktor Szidon, Paris, France

No Drawing. Application April 24, 1931, Serial No. 532,504, and in France December 18, 1930

2 Claims. (Cl. 23—147)

This invention relates to the manufacture of zinc white from zinc residues.

The various residues containing zinc, in particular the products of galvanization factories, zinc foundries and chemical industries employing zinc as reducing agent, are generally employed for the manufacture of the salts of zinc, the chloride and sulphate; if they are rich they are converted into zinc metal.

For some time numerous attempts have been made in order to enrich these zinc residues and to convert them into impure zinc oxide which subsequently serves for the manufacture of zinc metal.

The residues in question generally contain the zinc in the form of oxide and have as impurities almost always tin, lead, iron, silica, chlorine, carbon and other organic impurities which render their utilization difficult for the manufacture of zinc white.

The object of the present invention is the conversion of these residues into pure zinc white utilizable for paints, and other known applications of this product. The process of the invention comprises the step of subjecting the zinc residues, if necessary after suitable initial purification as described below, to distillation with progressive heating to 1000° C. or above under oxidizing conditions i. e. in an oxidizing flame or an oxidizing medium, a certain initial quantity of water being present.

In the first phase of heating the distillation takes place in the presence of water vapour and has for its effect to eliminate the sulphur and the chlorides or impurities of the same order contained in the residues.

In the second phase at a higher temperature the organic impurities are burnt, the sulphates decomposed into oxide and $SO_2$ which escapes at the same time as are eliminated by volatilization the metals and elements such as lead, tin, arsenic, and the like.

The zinc is thus obtained in the form of calcined oxide, and reduced to a small volume. It remains in the furnace with the non-volatile metals such as iron and with the silica. The oxide of zinc thus purified and in admixture with non-volatile metals is subsequently treated by any known means for the separation of the zinc oxide, for example, in a distillation furnace, e. g. in a Withrill type furnace grate, which furnace is well known in the zinc industry and here it is converted into zinc white, the non-volatile metals remaining as residue in the furnace.

Before progressively heating the zinc residues in accordance with the present invention they may be washed preferably with hot water with the double object on the one hand of removing the acidity or alkalinity of the residue and the various salts soluble in water and on the other hand after decantation and elimination of the excess of wash water and the light particles remaining in suspension without drying, of incorporating with the residues the quantity of water necessary for the actual distillation itself.

What I claim is:—

1. The process for the manufacture of zinc white from zinc residues as characterized, which consists in adding water to the residue both for eliminating soluble impurities and light non-soluble impurities and for incorporating water in close association with the remaining mass of residue, and then subjecting the mass to distillation in presence of the nascent vapor automatically formed under oxidizing conditions with progressive heating to above 1000° C.

2. In a process for the manufacture of zinc white from zinc residues such as obtained as residues from galvanization factories, zinc foundries and chemical industries employing zinc as reducing agents, comprising washing the said residue in water for eliminating a part of the impurities, and thereafter subjecting the residues remaining while still wet from the water to distillation progressively to 1000° C. under oxidizing conditions for vaporizing and oxidizing the zinc under influence of close association of the water therewith.

VIKTOR SZIDON.